Feb. 7, 1956 L. F. REINHOLD 2,733,871

TAPE RECORDER INPUT DEVICE

Filed Sept. 27, 1952 2 Sheets-Sheet 1

INVENTOR.

Leonhard F. Reinhold

BY Morris [signature]

ATTORNEY

Feb. 7, 1956 L. F. REINHOLD 2,733,871

TAPE RECORDER INPUT DEVICE

Filed Sept. 27, 1952 2 Sheets-Sheet 2

INVENTOR.
Leonhard F. Reinhold

BY Morris [signature]

ATTORNEY

United States Patent Office 2,733,871
Patented Feb. 7, 1956

2,733,871

TAPE RECORDER INPUT DEVICE

Leonhard F. Reinhold, Great Kills, N. Y., assignor to Radio Corporation of America, a corporation of Delaware Application September 27, 1952, Serial No. 311,841

18 Claims. (Cl. 242—55)

This invention relates to a magnetic tape recorder and to a system for recording on magnetic tape by means of a typewriter, and particularly to a reeling mechanism for a magnetic tape recorder for winding magnetic tape synchronously with intermittent operation of a typewriter.

Magnetic recording tape as an information storage medium has found considerable utility in large scale computers and other information handling systems. Large quantities of information or data may be encoded and stored indefinitely on magnetic tape in a form which is especially suitable for utilization by a computer. However, the task of encoding large masses of information in the form of electric signals and of recording the signals on magnetic tape can be laborious. Moreover, the task is one that regularly arises in preparation for computer operations. It is, therefore, desirable that simple apparatus be provided which requires a minimum of skill whereby the encoding and recording process may become a routine operation.

A typewriter is ideally suited for the encoding process since proficiency in its operation is common. The patent to Bush, No. 2,408,754, describes one system of adapting a standard typewriter for electrically encoding information to be printed or perforated on paper tape. An encoding system for magnetic tape is analagous to that of Bush in that a pulse is or is not recorded in the form of a magnetized or unmagnetized spot on magnetic tape, similarly as paper tape is perforated or left unperforated. However, a commercial magnetic tape recorder for sound is not adapted for use with a typewriter, which is inherently intermittent in operation. In a commercial tape recorder the emphasis is placed on continuous and constant tape motion for faithful sound reproduction. In order to record the characters in signal pulse form produced by irregular and intermittent typewriter keying operations, the recording tape should be stationary during recording and should be reeled synchronously with the keying operations. Thus, motion of the tape should be in discrete steps, each corresponding to the operation of a typewriter key. At the same time, recorded characters should be closely spaced to provide a compact storage of information. Additional desirable features of a tape recorder reeling mechanism, appropriate for use with a typewriter, are high speed operation and a precision of character spacing that permits back spacing for erasure of errors. Known intermittent reeling mechanism for magnetic tape which make use of a sprocket drive, as in the Potts patent, No. 2,560,474, have not had to meet these requirements of compactness, high speed, and precision.

Accordingly, it is an object of this invention to provide an intermittent tape reeling mechanism for a typewriter controlled magnetic tape recorder.

Still another object of this invention is to provide a high speed, intermittent reeling mechanism for a magnetic tape recorder.

Yet another object of this invention is to provide an intermittent reeling mechanism that permits small, precise, discrete steps of winding.

These and other objects of this invention are achieved by means of a standard electric typewriter which may be adapted in the general manner described in the Bush patent, supra, to provide permutation code signals for each character symbol on the typewriter. The typewriter is modified by providing control circuit switches actuated by the back space and carriage return keys, and a switch actuated by stepping of the typewriter carriage. A magnetic tape recorder of the type having supply and take-up reels and a capstan drive is used. Magnetic recording and erasing heads are arranged transversely of the path of the tape. Supply and take-up reel drives are each connected to a continuously rotating motor through a variable magnetic clutch. In normal operation, torque is transmitted by each reel clutch to maintain the tape at each reel under tension. Means are provided to sense variations of tape tension from a predetermined amount and to adjust the torque transmission of the clutches to restore the tape tension. The capstan drive is coupled to the motor through an indexing device and a bidirectional magnetic clutch. The field windings of the reel and capstan drive clutches are connected in control circuits through the switches actuated by the typewriter carriage and the back space and carriage return keys.

When a symbol key of the typewriter is depressed, code signals are produced which are recorded on the then stationary magnetic tape. The typewriter carriage advances a space and the carriage switch closes a circuit which activates the capstan drive clutch for torque transmission in a tape advancing direction. Simultaneously, there is an increase of torque transmission in the clutches for the take-up and supply reels. The indexing device is driven by the bidirectional clutch, and in turn drives the capstan through a predetermined rotation. The capstan advances the magnetic tape towards the take-up reel, and the take-up reel quickly winds up the available tape under increased torque transmitted by its clutch. After a predetermined rotation of the bidirectional clutch, a holding circuit is broken so that the bidirectional clutch is deactivated and the tape is maintained stationary for recording of the next character and repetition of the cycle. Operation of the back space key prepares the control circuits for activation of the bidirectional clutch in back space direction as well as increase of torque transmission in the take-up and supply reel clutches upon the carriage switch being closed by the backstepping carriage. The reeling cycle is then repeated, but in the reverse direction. The carriage return switch opens the carriage switch circuit to prevent actuation of a reeling cycle during return of the typewriter carriage.

The organization and method of operation of the invention may be best understood from the following description and the accompanying drawings in which.

Figure 1:
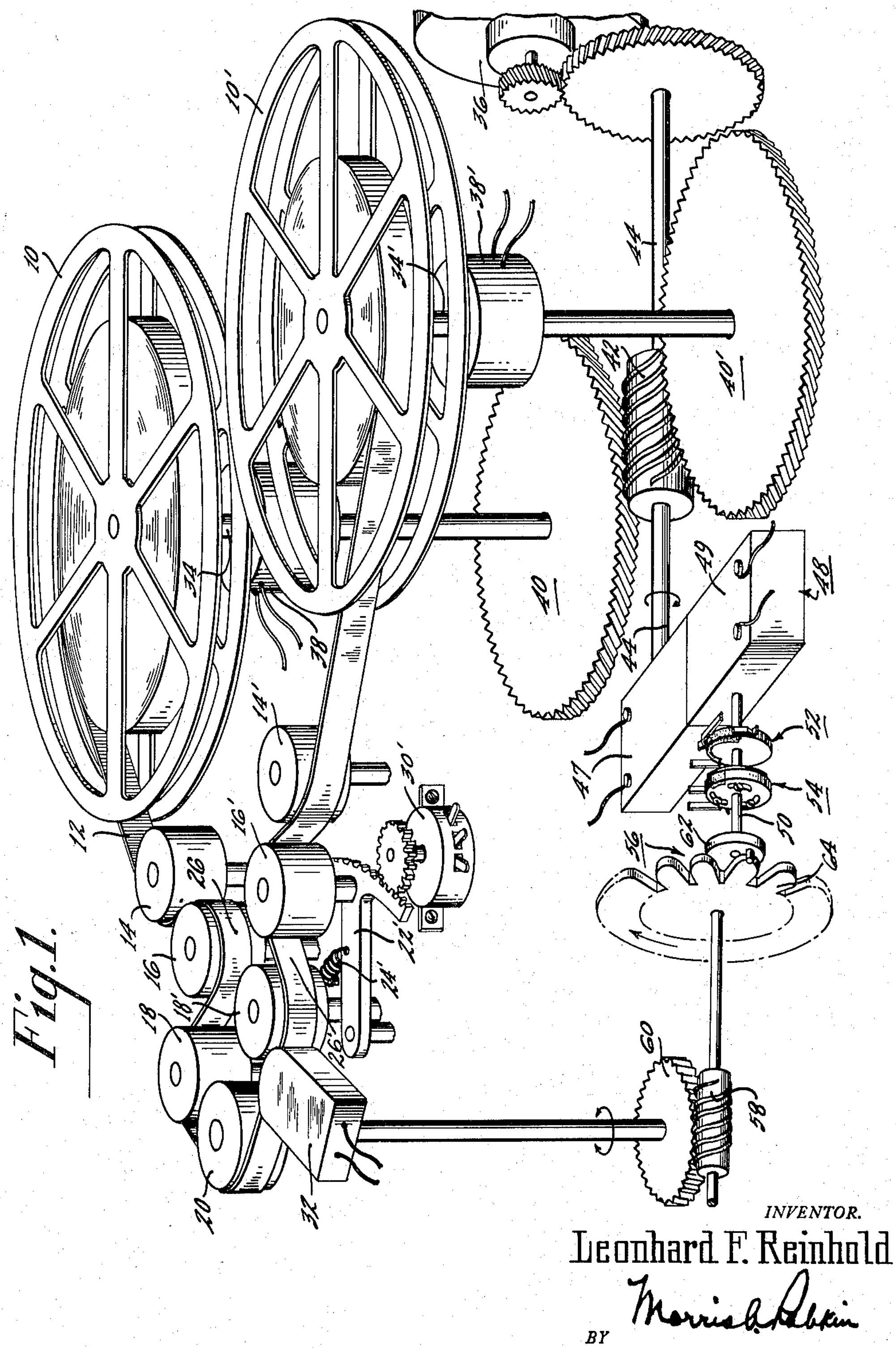
Figure 1 is a perspective view with parts shown diagrammatically of a magnetic tape recorder embodying this invention.
Figure 2:
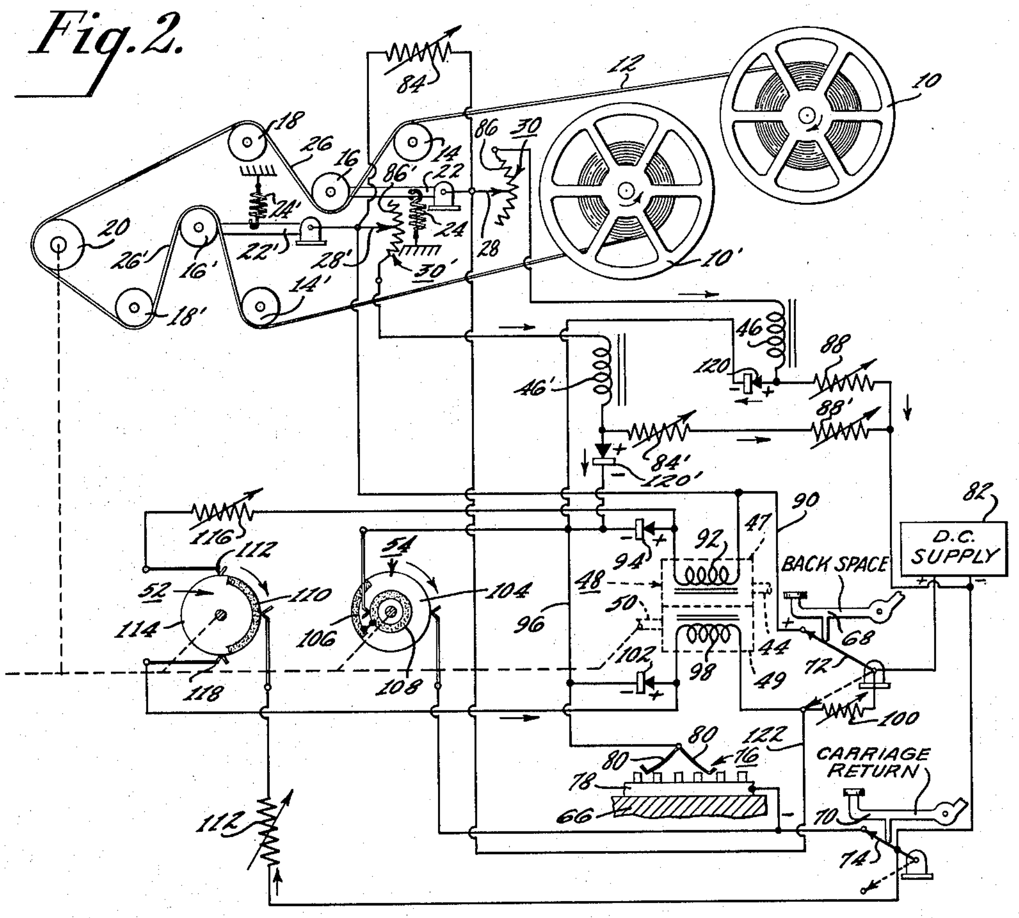
Figure 2 is partially a schematic circuit diagram and partially a diagrammatic view of mechanical elements of a magnetic tape recorder and a typewriter embodying this invention.

Referring now to Figure 1, a magnetic tape recorder is shown which has a supply reel 10 from which magnetic tape 12 is unwound, and a take-up reel 10' to which the tape is advanced. From the supply reel 10, tape passes around a first idler roller 14 and then around a supply reel pressure roller 16, a second idler roller 18, a capstan or drive pulley 20, a third idler roller 18', a take-up reel pressure roller 16', and a fourth idler roller 14', in that order, to the take-up reel 10'. The pressure rollers 16, 16' are mounted on pivoted arms 22, 22' (Figures 1 and 2) which are biased by springs 24, 24' in a tape tensioning direction to form tension loops 26, 26' in the tape. Each pivoted arm 22, 22' is connected by gearing to the movable contact 28, 28' of a rheostat 30, 30' (Figure 2). Magnetic recording and erasing heads 32 may be mounted between the capstan 20 and the succeeding idler roller 18'. Each tape reel 10, 10' is mounted on a drive shaft 34, 34', and is connected to a continuously rotating motor 36 by means of a magnetic clutch 38, 38', a worm wheel 40, 40', a common worm 42, and a common main shaft 44. The worm wheels 40, 40' are driven in opposite directions producing opposite rotations of the reels. The magnetic clutches 38, 38' may be the fluid magnetic type described by J. Rabinow in his patent, No. 2,575,360, or the modified type in which the fluid vehicle is replaced by a powder.

Each clutch is formed as a capsule having a field winding 46, 46' (Figure 2), and the current through the field winding can be varied to vary the torque coupling or transmission in the clutch. This invention is not limited to the use of electromagnetic clutches. Any electrically-controlled clutch in which the torque transmission can be varied by variations in an electric signal is appropriate.

The main shaft 44 of the motor 36 is also used to drive the capstan pulley 20, as follows: The main shaft 44 forms the input shaft of a bidirectional clutch 48. The latter is formed of two magnetic clutch capsules 47, 49, advance and reverse, both of which are internally geared to the input shaft 44 and also to the output shaft 50 of the clutch 48. In this way, the output shaft 50 rotates either clockwise or counter-clockwise, depending on which clutch capsule is energized. The capsules of the bidirectional clutch may be the same types as the reel clutches. Mounted on the output shaft 50 of the bidirectional clutch 48 are first and second contact discs 52, 54 to be described in detail later. The output shaft 50 of the bidirectional clutch 48 is connected to the capstan pulley 20 through an indexing device 56 and blocking gears formed by a worm 58 and a worm wheel 60. The indexing device 56 may be of the high speed type having intermittent gearing producing an operating period and a dwelling period, such as is described in Jones "Ingenious Mechanisms for Designers and Inventors," volume I, 1930, Figure 2B, pages 69 and 70. The driver 62 of the indexing device is mounted on the output shaft 50 of the clutch 48 and the follower 64 is connected to the worm 58 of the blocking gears.

As will be described in detail later, the field windings 46, 46' of both reel clutches 38, 38' are normally energized during operation of the recorder. Thus, there is a slipping connection between both reel drive shafts 34, 34' and the motor 36. The reels 10, 10', as a result, have oppositely directed torques applied at all times such as to maintain the tape under a predetermined tension. Thus, the reeling mechanism is in a dynamic state even though the magnetic tape is stationary. Activation of the advance capsule 47 of the bidirectional clutch 48 drives the capstan 20 so as to pull tape from the tension loop 26 at the supply reel and advance it towards the tension loop 26' at the take-up reel. The pressure roller 16 at the supply reel unwinds sufficient tape from the supply reel to restore the tension loop, and the take-up reel winds up the available tape in its tension loop. Similarly, activation of the reverse capsule 49 of the bidirectional clutch will drive the capstan in the opposite direction to rewind the tape towards the supply reel. In this way, the tape at the capstan is always under proper tension and tape fluctuations at the reels are filtered out by the tension loops.

The typewriter used for encoding purposes and for controlling reeling of the magnetic tape recorder is a standard electric typewriter (not shown). It may be adapted for encoding purposes, as disclosed in the Bush patent, supra, by providing a plurality of photo tubes in light channels mounted underneath the typewriter keyboard. Shutters are attached to the keys for closing off the light channels to the photo tubes, and a different combination of such shutters on each key provides a different code permutation for each symbol or character. A separate recording head is coupled to each photo tube through an amplifier. Using a seven element code, as shown by Bush, there would be seven recording heads arranged transversely of the magnetic tape much as the punches of a tape perforator are arranged. Each time the light to a photo tube is blocked, a pulse would be recorded on the tape in the form of a magnetized spot by the associated recording head. The typewriter adaptation for encoding is clearly shown by Bush, and since the adaptation, as such, is not part of this invention, it is not shown in the drawings.

The standard typewriter has a sliding carriage 66 (Figure 2) and back space and carriage return keys 68 and 70 respectively. The typewriter is modified by providing a double throw microswitch 72 adjacent the back space key and a normally closed single-throw microswitch 74 adjacent the carriage return key which are actuated by depressing those keys. There is also provided a carriage switch 76 to be actuated by stepping of the carriage 66. The carriage switch 76 may be formed by a contact bar 78 having a plurality of contact elements. The bar is fixed to the carriage and slidable with it, and insulated therefrom. The carriage switch 76 is completed by a pair of spring contacts 80 fixed to the typewriter frame and extending into the path of the contact bar. A pair of diverging spring elements 80 are used as the fixed contacts in the carriage switch to prevent a chattering effect in its operation when the contact bar 78 slides past. Also, the spacing between the spring contacts and the contact elements can be adjusted in any convenient manner to adjust the time duration of contact.

The energizing circuits for the field windings 46, 46' of the reel drive clutches 38, 38' have a common direct current supply source 82 (Figure 2). The circuit for the field winding 46 of the supply reel clutch 38 is traced from the positive terminal of supply 82 through the normally closed contacts of back space switch 72, a common lead 90, a first limiting resistor 84, the movable contact 28 and winding 86 of the supply-reel tension rheostat, the field winding 46, and back to supply 82. The circuit for the field winding 46' of the take-up reel clutch 38' is traced from supply 82 through the back space switch 72, the common lead 90, and the movable contact 28' and winding 86' of the take-up reel tension rheostat, the field winding 46', first and second limiting resistors 84', 88' and back to supply. The magnitudes of the limiting resistors are chosen to produce the same currents in the field windings.

The rheostats should be of the sensitive type used in servomechanisms. If desired, instead of using rheostats to control the reel clutches in response to variations in tape tension, other means such as electronic circuitry may be provided in which the pressure rollers 16, 16' vary inductance or capacitance and thus vary the currents in the clutches. One such arrangement is a differential transformer in which a magnetic core is moved by the pressure roller to vary differentially the inductive coupling between a primary and a pair of secondary coils. The primary coil is connected to an oscillator, and the secondary coils are connected to current-controlling devices which regulate the current energizing the tape drive clutch in accordance with the position of the pressure roller.

The energizing circuit for the field winding 92 of the advance capsule 47 of the bidirectional clutch 48 includes the direct current supply 82, the normally closed contact of the back space switch 72, the field winding 92, a blocking rectifier 94, a connecting lead 96 to the carriage switch 76 and is completed back to supply through the normally closed contacts of the carriage return switch 74. The field winding 98 of the reverse capsule 49 is normally energized from supply through a large limiting resistor 100 shunting the normally open contacts of the back space switch 72, the field winding 98, a blocking rectifier 102, the carriage switch 76, and through the carriage return switch 74 back to supply.

A holding circuit across the carriage switch 76 is provided by the second contact disc 54 mounted on the output shaft 50 of the bidirectional clutch 48. The contact disc 54 is formed of two rings, one of which has an insulating segment 104 and an adjustable conducting segment 106 and the other is a collector ring 108 connected to the conducting segment 106. The contact disc brushes are connected across the carriage switch contacts 78, 80. A balancing circuit for the field windings 92, 98 of the bidirectional clutch is formed by means of the first contact disc 52 mounted on the clutch output shaft 50. A brush normally contacting the conducting segment 110 of the disc is connected around the carriage return switch 74 to supply 82 through a resistor 112. An advance brush 112 normally contacts the insulating segment 114 of the disc and is connected to one end of the field winding 92 of the advance capsule through a large limiting resistor 116. A reverse brush 118 normally contacts the insulating segment 114 and is connected to the field winding 98 of the reverse capsule.

The field winding 46, 46′ of each of the reel clutches has a shunt connection to the negative terminal of supply through a blocking rectifier 120, 120′ and the carriage switch 76 or the holding circuit contact disc 54, when the contacts of either of the latter are closed. Similarly, when the back space switch 72 is in actuated condition (shown in broken lines), the field winding 46 of the supply reel clutch 38 is energized from supply 82 through the actuated back space switch 72, a second common lead 122, and the movable contact 28 and winding 86 of the tension rheostat, and back to supply through the limiting resistor 88 and also through blocking rectifier 120, the carriage switch 76 or holding circuit contact disc 54 depending upon the portion of the reeling cycle then occurring. Similarly, the field winding 46′ of the take-up reel clutch 38′ is energized (when the back space switch is actuated) from supply 82 through the actuated back space switch 72, the second common lead 122, the first limiting resistor 84, and the movable contact 28′ and winding 86′ of the tension rheostat, and back to supply through the limiting resistors 84′, 88′ and also through the carriage switch 76 or the holding circuit contact disc 54.

Figure 3:
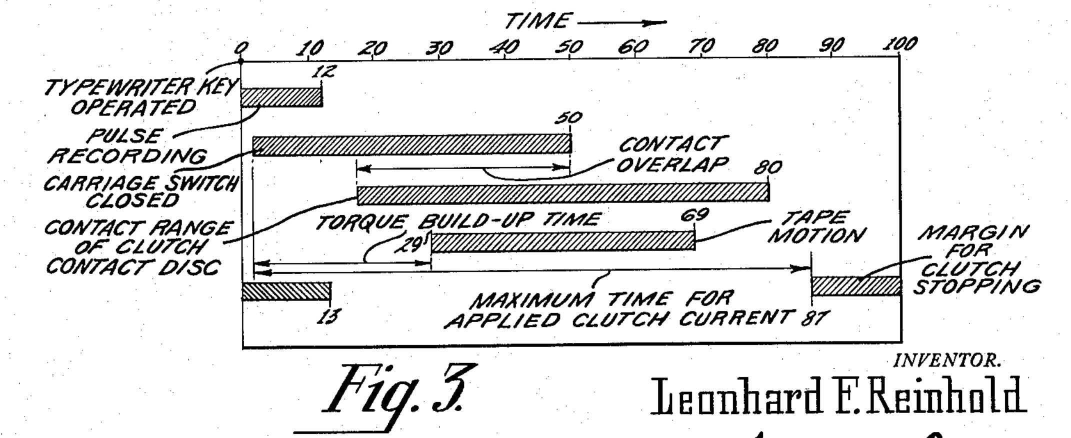
Figure 3 is a diagram of a typical timing cycle of the apparatus.

*Operation.*—Reference should be made to Figure 3 which indicates the time relations of portions of the reeling operation.

With current supplied to the field windings 46, 46′ of the reel clutches 38, 38′, sufficient torque is transmitted to the drive shafts 34, 34′ of the reels 10, 10′ to maintain the magnetic tape under tension. The pressure rollers 16, 16′ are moved by the tape against the biasing springs 24, 24′ and the rheostat contacts 28, 28′ occupy a medial position on the rheostat windings 86, 86′ (as shown in Figure 2). If the tape tension at either pressure roller 16 or 16′ is reduced or increased from a predetermined amount determined by the biasing springs 24, or 24′, the rheostat contact 28 or 28′ is moved correspondingly to reduce or increase the resistance in the energizing circuit of the field winding 46 or 46′, and thus increase or reduce the torque transmitted to the tape reel 10 or 10′, to restore tape tension to the predetermined amount. This arrangement permits automatic compensation of torque transmission in the clutches for variations in the amount of tape on the reels. There is a dynamic condition existing on the reel side of each tension loop, and a static condition on the capstan side of the loops. Substantially, equal tape tension is thereby maintained on each side of the capstan.

When a symbol key of the typewriter is actuated, a set of coded signals are produced which are recorded on the magnetic tape by the recording heads 32. At the same time, the typewriter carriage 66 steps one space and the contact bar 78 makes contact with the fixed spring contacts 80. This closes the energizing circuit through the field winding 92 of the advancing capsule 47 of the bidirectional clutch 48 and the normally closed back space switch 72 to supply 82. The clutch 48 is activated for torque transmission in the advance direction, and the output shaft 50 rotates. The contact time of the carriage switch 76 is sufficient to permit rotation of the conducting segment of the holding circuit contact disc 54 into engagement with the brush. There is sufficient overlap in contact time of the carriage switch and contact disc to prevent arcing (note Figure 3).

The output shaft 50 of the bidirectional clutch 48 rotates the driver 62 of the indexing device 56. The follower 64 remains stationary for at least a portion of its dwelling period before it is rotated by the driver. Thus, the tape remains stationary for a short time at the beginning of the reeling operation and recording of the coded character may take place within that time interval without distortion of the signal. After recording has taken place, the follower 64 of the indexing device is driven, and in turn, it drives the capstan pulley 20 through a predetermined rotation. Sufficient time has elapsed from activation of the clutch for enough torque to build up in the clutch to drive the indexing device and the capstan. At the same time that the bidirectional clutch 48 is activated, the field windings 46, 46′ of the supply and take-up reel clutches 38, 38′ are energized through rectifiers 120, 120′ and the carriage switch 76 (and then, a short time later, through the holding circuit contact disc 54) to short out the limiting resistors and thus increase the torque transmission in those clutches. The increase in torque transmission in the reel clutches takes up any possible slack in the tape, and tightens still more the tape around the capstan just before the indexing follower starts operating.

When the capstan starts to rotate, tape is drawn from the tape loop 26. The loop is shortened, and it moves the pressure roller to increase the rheostat resistance in the energizing circuit of the supply reel clutch. The torque transmission decreases, and the clutch slips. The biasing spring pulls the pressure roller back to unwind sufficient tape from the supply reel to restore the tape tension and the state of equilibrium. The capstan advances the tape towards the take-up reel to decrease the tape tension at the take-up reel tape loop 26′ which permits the pressure roller 16′ to move under its biasing spring 24′. The rheostat resistance is cut out of the circuit, and increased torque is applied to the take-up reel to quickly take-up the loose tape. Fluctuations in the reels are damped by the tension loops and cannot be reflected over the capstan to the indexing device 56, because of the blocking gears 58, 60.

After a predetermined rotation of the bidirectional clutch, the indexing follower 64 is again in the dwelling portion of its cycle, and the tape motion stops. Shortly thereafter, the edge of the conducting segment 106 of the contact disc 54 rotates out of engagement with the brush and the bidirectional clutch is de-energized. The output shaft of the clutch rotates a short distance under its own inertia before it comes to a stop. This rotation moves the contact disc insulating segment 104 through about half of the period of engagement with the brush and similarly moves the indexing driver 62 through a portion of the dwelling period. This may be considered a resetting operation, and the reason for it may be best understood by considering Figure 3.

The portions of the diagram labelled "Contact Range of Clutch Contact Disc," "Tape Motion," and "Margin for Clutch Stopping" are fixed with respect to each other since they are but different aspects of the rotational position of the output shaft 50 of the bidirectional clutch. Operation of a typewriter key determines the zero point of the time scale. Closure of the carriage switch (and recording of the signal pulses) may be considered as substantially coincident with zero time. Therefore, the time scale, and the portions labelled "Pulse Recording" and "Carriage Switch Closed" are fixed with respect to each other and may be considered as movable with respect to the lower three portions within certain limits.

In Figure 3, it is assumed for simplicity, that the previous cycle has ended in the middle of the idling period; half of the "Margin for Clutch Stopping" is shown on the left. The present cycle also ends in the middle of the "Margin," half of which is shown on the right. A typewriter key may be actuated at any time within the portion labelled "Margin for Clutch Stopping." Or considered in another way, the clutch should be stopped within the margin outlined, for the next cycle to be a proper operation. The reason for this is that sufficient time must elapse from activation of the clutch (approximately zero-time) until engagement of the indexing driver with the follower (the start of "Tape Motion"), in order that enough torque may build up in the clutch to drive the indexing follower and capstan. In Figure 3, the minimum build up time (when the previous cycle stops at the end of the "Margin") for suitable components is shown to be about 16 time units in an assumed cycle period. A back space operation (described below) is substantially the same as an advance operation, except for the direction, and about the same time is necessary for torque build up. Therefore, at least 16 time units should elapse from the end of tape motion until the clutch stops in a previous advance cycle for the output shaft to be properly positioned for an ensuing back space operation. An examination of Figure 3, shows that the outer limit for stopping the clutch for an ensuing advance cycle is about 44 time units from the end of tape motion. Since provision must be made for both contingencies, the relative cycle positions of "Tape Motion" and "Margin for Clutch Stopping" are as shown in Figure 3. As a result of this margin being quite large, mechanical losses and variations are safely accounted for. Furthermore, at high typing speeds, the bidirectional clutch may be continuously energized which increases the efficiency of the apparatus. Where the input apparatus for the tape recorded is automatic rather than a manually operated typewriter, still higher reeling speeds are possible. The reeling mechanism is adapted then for continuous operation with intermittent tape feed.

Where the tape drive mechanism requires a large torque from the output shaft, a correspondingly large current is required to energize the bidirectional clutch capsule. Under such circumstances, degaussing of the magnetic clutch may be necessary after the tape motion is completed, in order that the clutch be de-energized and the output shaft stopped within the desired time period. By degaussing is meant removal of the residual magnetism in the clutch capsule so that the clutch may slip freely during the idling period. This may be done in any of the various ways known in the art; for example, by sending a reverse current through the energized clutch capsule shortly before the clutch cycle is completed so that the output shaft is stopped within the desired time period.

A printed copy may be made during the typing operation and when an error is noticed, the tape recorder can be back spaced for erasure just as the typewriter carriage is back spaced. The magnetic recording heads may also be used as erasing heads. Upon operation of the back space key and during the back space reeling operation, an erasing signal is applied to the recording heads. Operation of the back space key 68 opens the contact of the switch 72 to the field winding 92 of the advance capsule of the bidirectional clutch and closes the contact to the reverse field winding 98. Then as the typewriter carriage 66 moves backwards, the carriage switch 76 is closed, and the reverse capsule 49 is activated. During a back space cycle, the capstan pulls tape from the tension loop at the take-up reel and advances it to the tension loop at the supply reel. Thus, the reeling cycle, as previously described, is repeated but in the reverse direction.

During a carriage return operation of the typewriter at the end of a line of printed copy, closure of the contacts of the carriage switch 76 does not activate the bidirectional clutch because the carriage return switch 74 in series with the carriage switch is opened by the carriage return key 70. However, the tape reel clutches remain energized to maintain the tape under tension.

Due to the counter-rotation of the two capsules 47, 49 in the bidirectional clutch 48, there should theoretically be no drag on the output shaft 50 when the clutch is inoperative and the input shaft 44 is rotating. However, residual magnetism, ball bearing and other internal friction may be unequal in the two capsules and cause the output shaft to drift. The balancing circuit counteracts any such drift. Drift of the output shaft 50 in advance or back space direction respectively rotates the conducting segment 110 of the balancing circuit contact disc 52 into engagement with the back space or advance brushes 118 or 112 respectively. Thus, one or the other of the capsules of the bidirectional clutch is energized with a small current limited by the large resistors in the balancing circuits, to return the output shaft to its normal inactive position.

The drift of the output shaft is generally in the same direction as the input shaft rotation, namely, in the advance direction as the apparatus is arranged. Related to this drift is the large limiting resistor 100 which shunts the normally open contacts of the back space switch. When a character key is operated, the back space clutch capsule receives a small energizing current through the limiting resistor 100 at the same time the advance capsule is fully energized. The small torque produced in the back space capsule opposes the torque causing drift in the output shaft. Thus, any slack in the mechanical system of the bidirectional clutch is eliminated. A similar condition is produced when the back space key is operated. Although the advance capsule is not energized at all, the output shaft drift is in the opposite direction from the full torque of the reverse capsule, and slack is eliminated.

In view of the dynamic state of the supply and take-up reel drives, discrete stepping of the magnetic tape may be made extremely small without loss of precision in spacing. Thus, encoded information is compactly recorded, and erasure during back spacing is accurate. The tape may be back spaced 80 times, a line of copy on the typewriter, and the recorded characters on the tape are lined up with the erasing or recording heads without clipping magnetically the adjacent recorded characters or leaving a significant remnant of the erased characters.

It is, therefore, evident from the above description that there has been provided a typewriter controlled magnetic tape recorder having a synchronously operated intermittent tape reeling mechanism which operates accurately at high typing speeds.

What is claimed is:

1. In a magnetic tape recorder having a supply reel and a take-up reel, reeling mechanism therefor comprising tape drive means for advancing tape towards said take-up reel and for advancing tape towards said supply reel, and means for intermittently apply a motive force to said tape drive means including a torque transmitting indexing device having an operating and a dwelling period, and an intermittently operable bidirectional torque transmitting device coupled to said indexing device.

2. In a magnetic tape recorder having a supply reel and a take-up reel, reeling mechanism therefor comprising rotatable tape drive means for advancing tape towards said take-up reel, and means for intermittently rotating said drive means including a rotatable torque transmitting clutch having an output shaft for coupling said drive means to a motive power source, switch means for activating said clutch, and means for deactivating said clutch actuated by a predetermined rotation of said output shaft, said deactivating means including switch means attached to said output shaft.

3. An intermittent, motor driven tape reeling mechanism to control feeding of tape on a supply reel and a take-up reel comprising rotary tape drive means for advancing tape towards said take-up reel, a supply reel drive and a take-up reel drive, first and second variable torque transmitting clutches for respectively coupling said supply reel and take-up reel drives to said motor for applying tape tensioning torques to said reels, means responsive to variations in tape tension at said supply and take-up reels for controlling torque transmission in said clutches, means for intermittently rotating said tape drive means including a third torque transmitting clutch intermittently operable for coupling said tape drive means to said motor, and switch means for activating said third clutch.

4. An intermittent, motor driven tape reeling mechanism to control feeding of tape on a supply reel and a take-up reel comprising rotary tape drive means for advancing tape towards said take-up reel, a supply reel drive and a take-up reel drive, first and second variable torque transmitting clutches for respectively coupling said supply reel and take-up reel drives to said motor for applying tape tensioning torques to said reels, means responsive to variations in tape tension at said supply and take-up reels for controlling torque transmission in said clutches, means for intermittently rotating said tape drive means including a third torque transmitting clutch intermittently operable for coupling said tape drive means to said motor, and circuit means for simultaneously increasing the torque transmission of said first, second, and third clutches.

5. An intermittent tape reeling mechanism as recited in claim 4 wherein said means for rotating said tape drive means includes an indexing device having an operating period and a dwelling period connected between said tape drive means and said third clutch.

6. An intermittent tape reeling mechanism as recited in claim 4 wherein each of said first, second and third torque transmitting clutches is an electrically controlled clutch having means to be energized, said tape tension responsive means being operable to control the energization of said first and second clutches, and said circuit means being operable simultaneously to increase the energization of said first, second, and third clutches.

7. An intermittent tape reeling mechanism as recited in claim 6 wherein said third clutch is bidirectional, and said rotary tape drive means is operable for advancing tape towards said supply reel.

8. An intermittent tape reeling mechanism as recited in claim 7 wherein said means for rotating said tape drive means includes an indexing device having an operating period and a dwelling period connected between said tape drive means and said third clutch, and said circuit means includes means for deactivating said third clutch after a predetermined rotation of the output shaft of said third clutch.

9. An intermittent motor driven tape reeling mechanism for controlling feeding of tape on a supply reel and a take-up reel comprising tape drive means for advancing tape towards said take-up reel, a supply reel drive and a take-up reel drive, first and second variable coupling torque transmitting clutches for respectively coupling said supply and take-up reel drives to said motor, a third torque transmitting clutch intermittently operable for coupling said tape drive means to said motor, said clutches being electrically controlled, and circuit means for activating said first and second clutches when said third clutch is inactive, said circuit means including a switch for simultaneously activating said third clutch and increasing the torque transmission coupling of at least one of said first and second clutches.

10. An intermittent tape reeling mechanism as recited in claim 9 wherein said third torque transmitting clutch is bidirectional and said tape drive means is operable for advancing tape towards said supply reel.

11. An intermittent motor driven tape reeling mechanism to control feeding of tape on a supply reel and a take-up reel comprising a rotary tape drive for advancing tape towards said take-up reel, means for maintaining the tape under tension at said rotary tape drive in a substantially static condition and simultaneously permitting said tape to be in a dynamic condition at said supply and take-up reels, means for applying tape-tensioning torques to said supply and take-up reels, means for intermittently coupling said rotary tape drive to said motor including (1) a torque transmitting indexing device having an operating period and a dwelling period, and (2) an electrically-controlled torque transmitting clutch coupled to said indexing device, and switch means for activating said electrically-controlled clutch.

12. The combination of a typewriter having manually operable keys, a reeling apparatus for a magnetic tape recorder comprising (1) a supply reel drive, (2) a take-up reel drive, (3) a tape drive, and (4) means for applying a motive force to said tape drive including (*a*) an indexing device having an operating period and a dwelling period, and (*b*) a torque transmitting clutch connected to said indexing device, and switch means actuated by operation of certain ones of said typewriter keys for activating said clutch.

13. The combination recited in claim 12 wherein one of said typewriter keys is a back space key, and said clutch is bidirectional, said switch means being actuated by operation of said back space key for activating said clutch for torque transmission in one direction and actuated by operation of certain other ones of said typewriter keys for activating said clutch for torque transmission in the opposite direction.

14. The combination of a typewriter having manually operable keys, a motor driven reeling apparatus for a magnetic tape recorder comprising (1) a supply reel drive, (2) a take-up reel drive, (3) a rotary tape drive, (4) an indexing device connected to said tape drive, and (5) a rotary torque transmitting clutch for connecting said indexing device to said motor, switch means actuated by operation of certain ones of said typewriter keys for activating said clutch, and means for deactivating said clutch after a predetermined rotation thereof.

15. The combination recited in claim 14 wherein said typewriter has a slidable carriage and a carriage return key, said switch means having a portion thereof secured to said carriage, and including means for preventing activation of said clutch upon operation of said carriage return key.

16. The combination of a typewriter having manually operable keys including a back space key, a motor driven reeling apparatus for a magnetic tape recorder comprising (1) a supply reel drive, (2) a take-up reel drive, (3) first and second electromagnetic torque transmitting clutches for respectively coupling said supply reel and take-up reel drives to said motor for applying tape tensioning torques to said reels, (4) a rotary tape drive, (5) an indexing device connected to said tape drive and (6) a bidirectional electromagnetic torque transmitting clutch for connecting said indexing device to said motor, switch means actuatable by operation of said back space key for simultaneously activating said bidirectional clutch for torque transmission in one direction and increasing the torque transmission of said first and second clutches and actuatable by operation of certain other ones of said typewriter keys for simultaneously activating said bidirectional clutch for torque transmission in the opposite direction and increasing the torque transmission of said first and second clutches, and means for deactivating said bidirectional clutch after a predetermined rotation of said bidirectional clutch.

17. In a recorder for a magnetic recording medium, a reeling mechanism comprising rotatable drive means for said recording medium, an electrically controlled bidirectional torque transmitting clutch having an output shaft, means for activating said clutch, means for deactivating said clutch after a predetermined rotation of said output shaft not greater than a single revolution thereof, and means connected to said output shaft for rotating said drive means a predetermined amount, said means for rotating said drive means being operable only during a predetermined rotation of said output shaft less than a single revolution thereof.

18. In combination with a typewriter having manually operable keys including a back space key, a reeling apparatus for a magnetic recording medium comprising rotatable drive means for said recording medium, an electrically controlled bidirectional torque transmitting clutch having a single output shaft coupled to said drive means, switch means actuated by operation of said back space key for activating said clutch for torque transmission in one direction and actuated by operation of certain other ones of said keys for activating said clutch for torque transmission in the opposite direction, and means for deactivating said clutch after a predetermined rotation of said output shaft.

References Cited in the file of this patent

UNITED STATES PATENTS

| | | |
|---|---|---|
| 1,325,825 | Bailey, Jr. | Dec. 23, 1919 |
| 1,370,747 | Ide | Mar. 8, 1921 |
| 1,848,663 | Robinson, Jr. | Mar. 8, 1932 |
| 1,997,601 | Reiber | Apr. 16, 1935 |
| 2,069,631 | Thomas | Feb. 2, 1937 |
| 2,088,451 | Thomas | July 27, 1937 |
| 2,304,913 | Herzig | Dec. 15, 1942 |
| 2,365,691 | Fodor | Dec. 26, 1944 |
| 2,469,706 | Winther | May 10, 1949 |
| 2,488,482 | Swarthout et al. | Nov. 15, 1949 |
| 2,535,486 | Dank | Dec. 26, 1950 |
| 2,550,281 | Martin | Apr. 24, 1951 |
| 2,579,598 | Morrison | Dec. 25, 1951 |
| 2,656,129 | Turk et al. | Oct. 20, 1953 |